(12) United States Patent
Boylan

(10) Patent No.: US 7,503,284 B2
(45) Date of Patent: Mar. 17, 2009

(54) PET WASHING STATION

(76) Inventor: Carroll J. Boylan, 3410 W. 88th St., Leawood, KS (US) 66206

( * ) Notice: Subject to any disclaimer, the term of this patent is extended or adjusted under 35 U.S.C. 154(b) by 0 days.

(21) Appl. No.: 11/261,887

(22) Filed: Oct. 28, 2005

(65) Prior Publication Data

US 2007/0095301 A1   May 3, 2007

(51) Int. Cl.
*A01K 29/00* (2006.01)
*A47K 3/00* (2006.01)

(52) U.S. Cl. .............................. 119/676; 119/603; 4/559

(58) Field of Classification Search ............... 119/603, 119/604, 665, 671, 673, 676; 4/541.1, 545, 4/546, 559
See application file for complete search history.

(56) References Cited

U.S. PATENT DOCUMENTS

| | | | | | |
|---|---|---|---|---|---|
| 2,438,979 | A | * | 4/1948 | Short | 119/751 |
| 3,055,357 | A | * | 9/1962 | Redka | 601/46 |
| 3,317,706 | A | * | 5/1967 | Fischer | 392/451 |
| 3,583,368 | A | * | 6/1971 | Mandelhaum et al. | 119/603 |
| 3,611,450 | A | * | 10/1971 | Bost | 4/628 |
| 4,834,027 | A | * | 5/1989 | Meyer | 119/771 |
| 4,850,997 | A | * | 7/1989 | DuBose | 604/289 |
| 4,880,415 | A | * | 11/1989 | Urakami | 604/291 |
| 4,924,069 | A | * | 5/1990 | Giordani | 392/485 |
| 5,193,487 | A | * | 3/1993 | Vogel | 119/671 |
| 5,243,931 | A | * | 9/1993 | McDonough | 119/671 |
| 5,269,260 | A | * | 12/1993 | Farrell et al. | 119/676 |
| 5,483,925 | A | * | 1/1996 | Childress | 119/795 |
| 5,662,069 | A | * | 9/1997 | Smith | 119/665 |
| 5,678,511 | A | * | 10/1997 | Day | 119/676 |
| 5,711,252 | A | * | 1/1998 | Brandolino | 119/673 |
| 5,794,570 | A | * | 8/1998 | Foster et al. | 119/756 |
| 5,829,392 | A | * | 11/1998 | Coleman | 119/795 |
| 5,845,604 | A | * | 12/1998 | Cucchi et al. | 119/673 |
| 5,974,601 | A | * | 11/1999 | Drane et al. | 4/539 |
| 6,003,166 | A | * | 12/1999 | Hald et al. | 4/541.1 |
| 6,237,537 | B1 | * | 5/2001 | Winchester | 119/673 |
| 6,401,666 | B1 | * | 6/2002 | Kircher | 119/792 |
| 6,925,964 | B2 | * | 8/2005 | Jeffery | 119/673 |
| 6,988,467 | B1 | * | 1/2006 | Smith | 119/675 |
| 7,032,840 | B2 | * | 4/2006 | Freidell | 239/307 |
| 7,080,608 | B1 | * | 7/2006 | Arndt et al. | 119/671 |
| 7,107,937 | B1 | * | 9/2006 | Anderson | 119/671 |
| 2007/0039559 | A1 | * | 2/2007 | Foster | 119/676 |

* cited by examiner

*Primary Examiner*—Michael R Mansen
*Assistant Examiner*—Joseph W Sanderson
(74) *Attorney, Agent, or Firm*—Spencer, Fane, Britt & Browne LLP

(57) ABSTRACT

A pet washing station apparatus in combination with a supply of water adapted for washing a domestic animal having a collar attached to a collar fastener extending from a leash secured to a basin sidewall extending from a basin bottom and ending at a basin upper lip. The upper lip is configured with plural compartments for receiving pet accessories. A converter integrated into the basin sidewall is included for converting the water supply for washing the domestic animal, the converter including an integrated heating source and a distribution system for receiving the water supply and distributing the converted water to the interior of the basin. The distribution system may include a water connector and a spray nozzle for conveniently distributing the converted water to the apparatus.

5 Claims, 3 Drawing Sheets

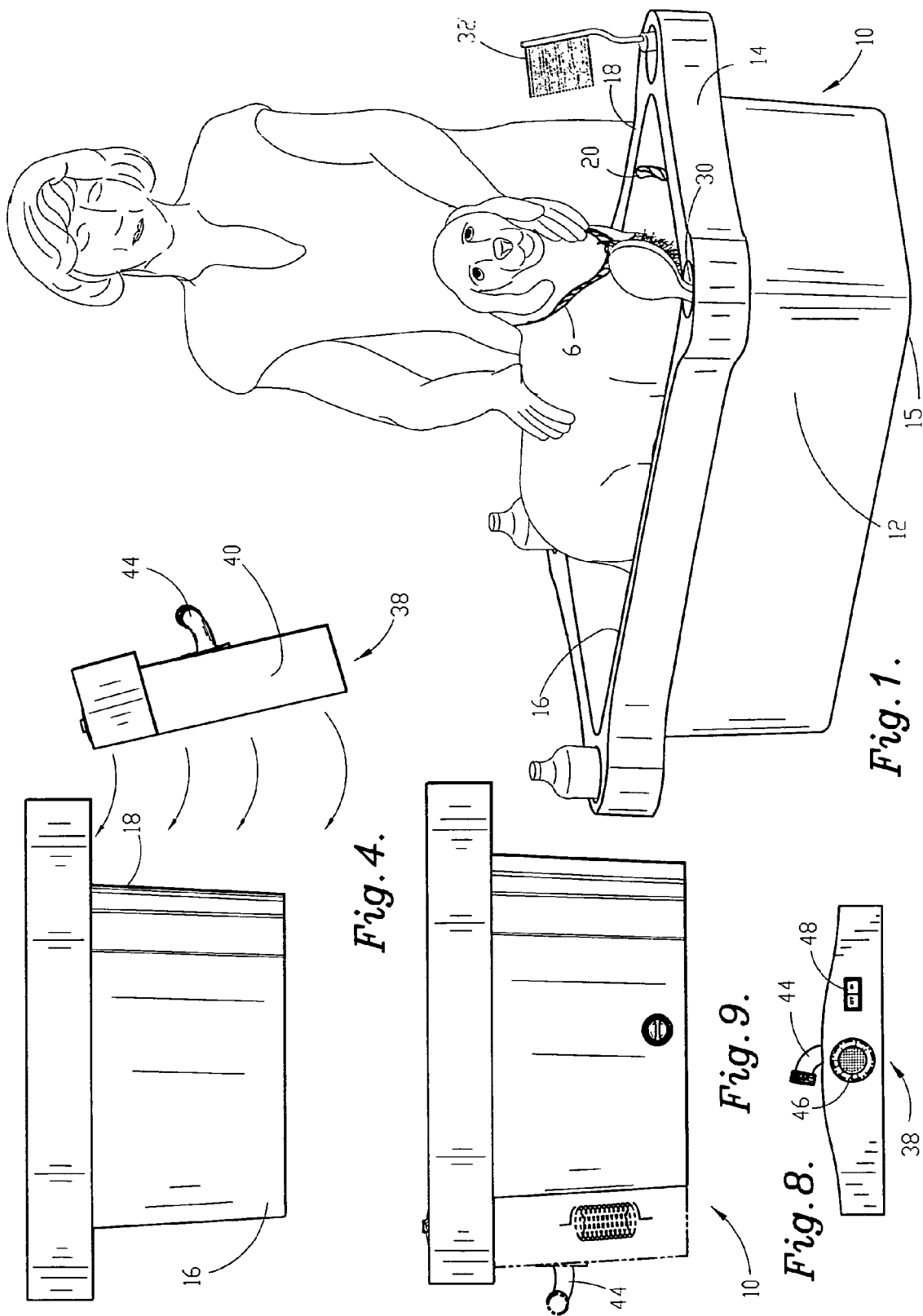

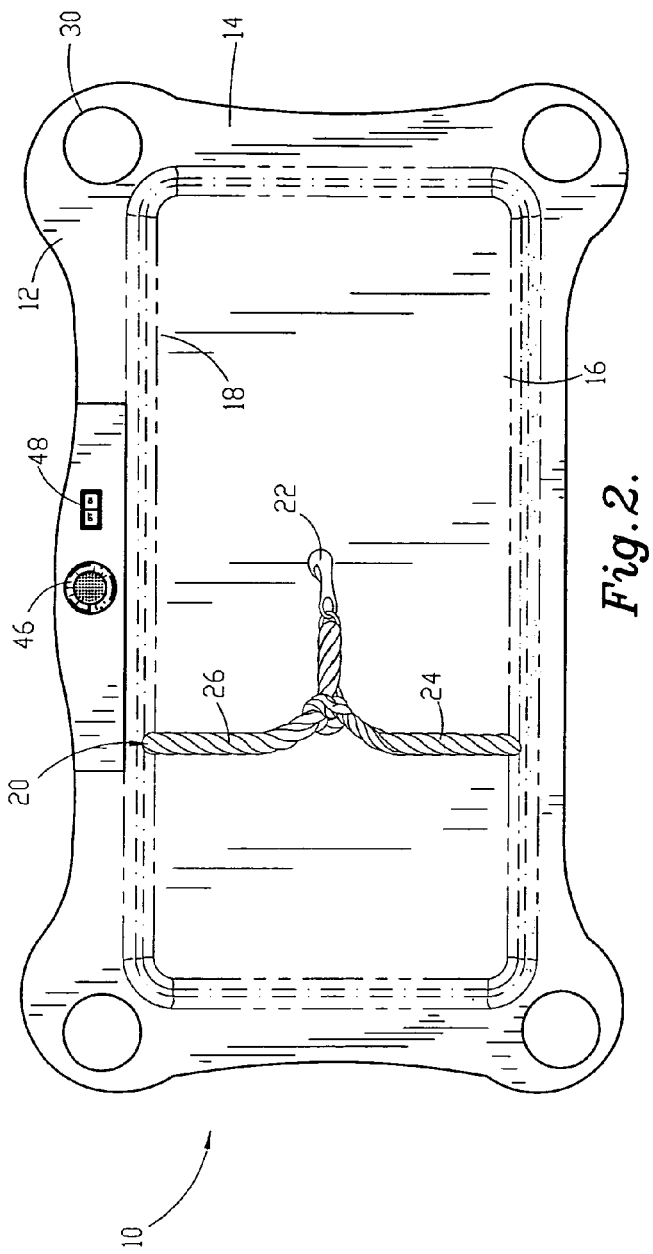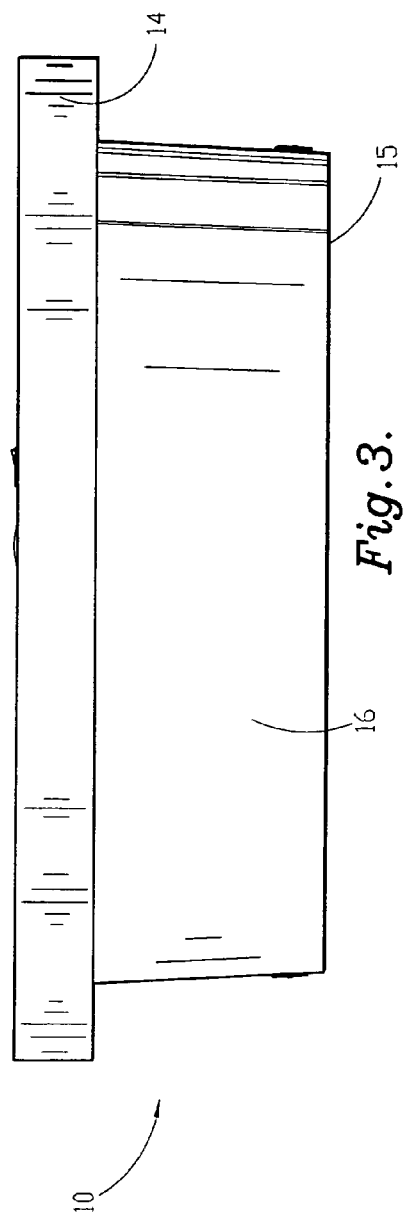

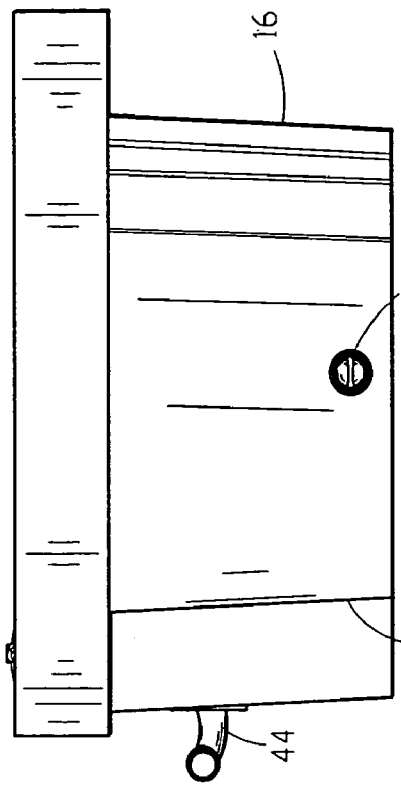
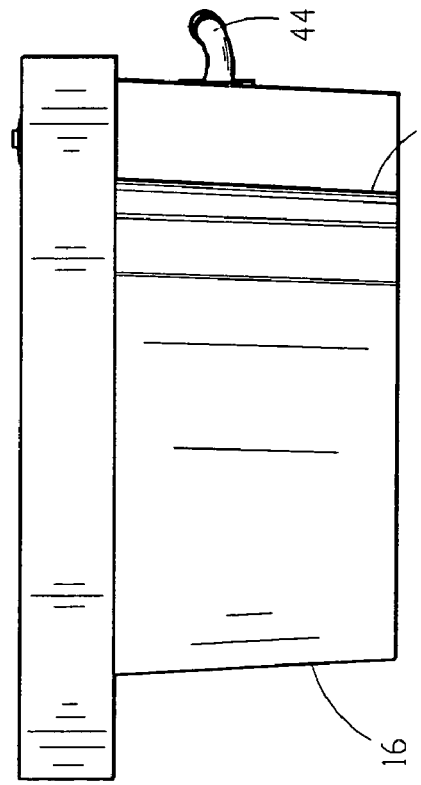
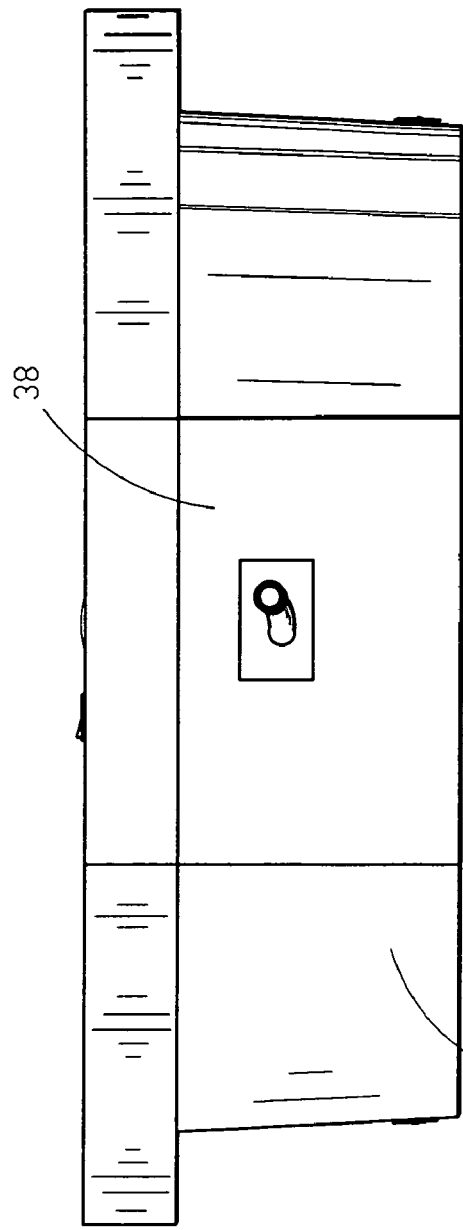

PET WASHING STATION

FIELD OF THE INVENTION

The present invention relates generally to water basin and more particularly to a washing basin for a domestic animal.

BACKGROUND OF THE INVENTION

Domestic animals are popular and provide a source of enjoyment for many people. However, they require care to remain healthy and happy. In particular, washing a domestic animal is sometimes challenging, in that while washing the animal some animals refuse to remain stationary and attempt to remove themselves from the washing source. In addition, some animals dislike the cold water which may be associated with the washing source. Also, cold water is not as effective at removing the oils which may be present on the animal. It would therefore be beneficial to provide a domestic animal washing basin which located the animal in a fixed position and provided warm water to help wash the domestic animal.

SUMMARY OF THE INVENTION

The present invention provides a pet washing station apparatus including a basin with a first and second side configured for allowing a domestic animal to enter the basin, the apparatus being in combination with a supply of water for washing the domestic animal having a collar attached to a collar fastener extending from a leash which is connected to the basin side. The basin also includes a converter for converting the connected water supply for use to wash the domestic animal, the converter including an integrated heating source and a distribution system for receiving and distributing the converted water for washing the animal. The distribution system may include a water connector and a spray nozzle for conveniently distributing the converted water to the apparatus.

BRIEF DESCRIPTION OF THE DRAWINGS

The drawings constitute a part of this invention and include exemplary embodiments of the present invention and illustrate various objects and features thereof.

FIG. 1 is a right side perspective view of a pet washing station apparatus in accordance with the present invention having a domestic animal.

FIG. 2 is a top plan view of the apparatus according to the present invention.

FIG. 3 is a right side elevational view of the apparatus in accordance with the present invention.

FIG. 4 is a front elevational view of the apparatus in accordance with the present invention.

FIG. 5 is a front elevational view of the apparatus in accordance with the present invention.

FIG. 6 is a rear elevational view of the apparatus in accordance with the present invention.

FIG. 7 is a left side elevational view of the apparatus in accordance with the present invention.

FIG. 8 is a top plan view a converter in accordance with the present invention.

FIG. 9 is a rear elevational view of the apparatus in accordance with the present invention.

DETAILED DESCRIPTION

I. Introduction.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. Washing Station.

Referring to FIG. 1, an embodiment of the present invention a pet washing station apparatus generally indicated by reference numeral 10 being in receipt of a domestic animal having a collar 6 secured to a wash basin 12 with the leash 20. The washing station 10 generally has a wash basin 12 and an upper lip 14 extending outwardly from the wash basin 12. The upper lip 14 is illustrated with at least one storage compartment 30 integrated into the lip 14. The compartment 30 is generally adapted for receiving washing accessories 32 such as but not limited to a comb, soap, brush, dietary supplements, and bathing or grooming accessories.

The basin 12 is adapted to receive and hold water for washing, as well as to receive the animal. The basin 12 may be stationary and adapted for location on a table or it may be adapted for relocation with the use of optional casters or wheels for moving the basin. Because dogs vary in shape and size, the basin 12 may have alternative shapes and sizes to accommodate a variety of animals. In FIG. 1 the basin 12 is illustrated as having a generally rectangular shape including a first sidewall 16 opposite a second sidewall 18. In addition, although the basin 12 is illustrated with an elongated "bone" shape, it may have a variety of configurations which allow for use of the compartment 30 in combination with the basin 12. The basin water level may be varied to accommodate a variety of animals from small domestic pets to larger animal varieties. Preferably, the basin 12 may be fabricated from a water resistant, strong, lightweight material such as plastic, however, alternative materials may be used, such as but not limited to wood or aluminum.

The leash 20 is illustrated in FIG. 2 generally connected to the wash basin 12 and extending to a collar fastener 22 adapted for connection to the dog collar 6. The leash 20 may have a variety of configurations, including attachment to a first or a second basin sidewall or both 16, 18, the basin bottom 15 or the basin lip 14. The leash 20 is illustrated in FIG. 2 including a first member 24 and a second member 26 extending from the first sidewall 16 and the second sidewall 18 respectively, the first and second members 24, 26 being joined at a connection point generally orientated at a basin midsection for connection to the collar 6. A third member 28 is presented by the joined first and second members 24, 26. The first and second members 24, 26 may be joined together using a variety of methods including but not limited to a standard mechanical fastener, however, the members in FIG. 2 are illustrated as being intermingled at a tied knot at the junction of the first, second and the third member 24, 26, 28.

A plurality of storage compartments 30 is also illustrated in FIG. 2, the compartments 30 being adapted for readily storing accessories 32 (not shown) at convenient locations such as along the upper lip 14 of the basin 12. The compartments 30 are illustrated as being circular, however, alternatively configured shapes may be provided for the stored accessories 32. A nozzle 46 is also illustrated as being located in association with wash basin 12, the nozzle 46 being optionally retractable for storage within the side wall 18 of the wash basin 12. The nozzle 46, is adapted for transmitting water from a water supply (not shown) to the wash basin 12 while the domestic animal is located therein. The nozzle 46 in fluidic communication with the basin 12 may have a variety of spray patterns, mounting configuration and functions including a spray or stream pattern optionally having a pulse modulation function to vary the intensity of the transmitted fluid for distribution to the basin 12 for washing the domestic animal. A flexible hose may be connected to the nozzle 46, the hose being internally stored within the basin sidewall 18, alternatively a pipe may be used for connecting the nozzle 46 to the water supply. The nozzle 46 may also include a shut-off switch in communication with a shut-off valve.

FIG. 2 illustrates the upper lip 14 of the sidewall 18 with an operator 48 extending from the surface of the upper lip 14. The operator 48 may be in communication with the nozzle 46 for selectively delivering the water to the basin 12 for washing the domestic animal. Additional controls may be added to the apparatus including a temperature limiting or controlling device as well as a pressure regulator in combination with a water pump to vary the water flow.

FIG. 3 illustrates the apparatus with the first basin sidewall 16 extending from the basin bottom 15 to the basin upper lip 14. The upper lip 14 may be integrated into the basin sidewall 16 or it may be removably attached to the upper portion of the basin sidewall 16 allowing the basin to be conveniently transported and stored with the lip 14 being removed. The upper lip, 14 may include a variety of configuration, however, preferably the upper lip 14 is configured with a depth sufficient to support and store various accessories 32 which may be used with the basin 12.

A converter 38 is illustrated in FIG. 4 being detachably connected to the basin second sidewall 18 for washing the domestic animal. The converter 38 is illustrated with a water connection 44 for connection to a water supply such as a standard hose connection. In addition, a heating source 40 is illustrated in phantom line within the converter 38 in FIGS. 4 and 9. The converter 38 is adapted for heating the water supply from a standard ambient temperature to a generally warm temperature for washing the domestic animal. The heated water supply helps clean the domestic animal, the heated water being especially useful for washing away any trapped oils within the coat of the domesticated animal with or without soap. The converter 38 may include a heating source 40 integrated within the basin 12 and adapted for heating the water supplied to the basin along with a distribution system 42 for receiving the water supply and distributing the heated water from the heating source 40 to the apparatus 10. The heating source 40 may include a variety of heating elements such as but not limited to electric resistance, solar collectors or steam generators to heat the supplied water. Once heated, the water may be dispersed to the apparatus 10 for example with a pump from the converter 38 to the nozzle 46 for cleaning the domestic animal. Water heaters being generally understood, may include a number of different configurations for heating and dispersing the heated water to the basin 12. A water connector 44 is also illustrated in FIG. 4 attached to the converter 38 for connection to a standard plumbing fixture through a flexible hose such as a standard garden hose.

The converter 38 is illustrated as being generally rectangularly shaped having an interior and an exterior surface, the internal surface being adapted for housing the converter 38. The external surface is illustrated in FIG. 4 with a detachable connector 36 associated with the converter 38, the connector 36 being generally adapted for releasably connecting the converter 38 to the basin 12. The shape and fabrication of the converter 38 may vary depending on the needs and desires of the various users. Preferably, the converter 38 is lightweight for transporting, the connectors 36 being general mechanical fasteners such as but not limited to latch and hook assemblies for easy and secure attachment and removal of the converter 38 from the basin 12.

FIG. 5 illustrates the converter 38 attached to the basin sidewall 18 with the water connector 44 extending outwardly therefrom. FIG. 6 illustrates the opposite view of the apparatus with the attached converter 38. A drain 50 is also illustrated extending from the basin 12 adapted for the removal of any standing water. The drain 50 may be fabricated from a variety of materials including but not limited to nylon or a plastic material and may be configured using a number of different draining technologies including but not limited to a plug or spigot drain type. The drain 50 may also be located in a number of locations including on or along the basin bottom 15 or along the basin sidewalls 16, 18. Although, the drain 50 may have a number of variations, in location, style or materials, in general, the drain 50 is simply adapted for releasing depleting the water from the basin 12 through a basin wall. FIG. 7 provides another view of the converter 38 attached to the basin sidewall 18.

It will be appreciated that various other configurations and embodiments may fall within the scope of the present invention. While certain forms of the present invention have been illustrated and described herein, it is not to be limited to the specific forms or arrangement of parts described and shown.

Having thus described the invention, what is claimed as new and desired to be secured by Letters Patent is as follows:

1. A pet washing station apparatus in combination with a supply of water to wash a domestic animal having a collar, said apparatus comprising:
    a basin having a first and second opposing sides, said basin adapted for entry and exit of a domestic animal;
    a leash extending from a first member to a second member, said first member attached to said first basin side, said second member attached to said second basin side, a collar fastener extending from said leash and adapted for connecting to the collar;
    a distribution system having a water connector, a nozzle and a spigot being in fluidic communication therebetween, said water connector having threaded structure for connection to a standard garden hose and receiving water therefrom, said nozzle being adapted to transmit water received from said water connector to said basin and said spigot integrated within a sidewall of said basin for draining water therein; and
    a detachable heater having a front and rear, and a heating source positioned therebetween, said front releasably secured to said basin second side, said water connector extending outwardly from said rear opposite said basin second side, wherein the water is transmitted from said connector through the heater to the basin, whereby said water is heated for washing the animal, further wherein said apparatus is sized and shaped such that said apparatus may be carried from a first location to a second location by a human user of said apparatus.

2. The apparatus according to claim 1 wherein said nozzle is stored within said second sidewall.

3. A pet washing station apparatus in combination with a supply of water to wash a domestic animal having a collar, said apparatus comprising:
    a basin having a bottom, a up opposite said bottom and first and second opposing sides extending from said bottom to said lip, wherein said lip encircles said basin sides and extends outwardly therefrom;

a leash extending from a first member to a second member, said first member attached to said lip near said first side, said second member attached to said lip near said second side, a collar fastener extending from said leash and adapted for connecting to the collar;

a distributions system having a water connector, a nozzle and spigot being in fluidic communication therebetween, said water connector having threaded structure for connection to a standard garden hose and receiving water therefrom, said nozzle being adapted to transmit water received from said water connector to said basin and said spigot integrated within a sidewall of said basin for draining water therein; and a detachable heater having a front and rear, and a heating source positioned therebetween, said front releasably secured to said basin second side, said water connector extending outwardly from said rear opposite said basin second side, wherein the water is transmitted from said connector through the heater to the basin, whereby said water is heated for washing the domestic animal, and further wherein said apparatus is sized and shaped such that said apparatus maybe carried from a first location to a second location by a human user of said apparatus.

4. The apparatus according to claim 3 wherein said basin upper lip includes detachment structure for detachment of said lip from said basin.

5. The apparatus according to claim 3 wherein said lip further includes an upright cylindrical compartment having a circular opening adapted to receive a washing accessory.

* * * * *

UNITED STATES PATENT AND TRADEMARK OFFICE
CERTIFICATE OF CORRECTION

PATENT NO.       : 7,503,284 B2
APPLICATION NO.  : 11/261887
DATED            : March 17, 2009
INVENTOR(S)      : Carroll J. Boylan It is certified that error appears in the above-identified patent and that said Letters Patent is hereby corrected as shown below:

Claim 1, Col. 4, line 36, after "a basin having" delete "a".

Claim 1, Col. 4, line 57, after "washing the animal," insert --and--.

Claim 3, Col. 4, line 66, delete "up" and insert --lip--.

Signed and Sealed this

Sixteenth Day of June, 2009

JOHN DOLL
*Acting Director of the United States Patent and Trademark Office*